(12) United States Patent
Ogino et al.

(10) Patent No.: US 6,976,947 B2
(45) Date of Patent: Dec. 20, 2005

(54) CENTRIFUGAL EXTRACTOR OF NON-CONTACT JOURNALED CONSTRUCTION

(75) Inventors: Hideki Ogino, Naka-gun (JP);
Kazuhiko Fujisaku, Naka-gun (JP);
Tadahiro Washiya, Naka-gun (JP)

(73) Assignee: Japan Nuclear Cycle Development Institute, Ibaraki-ken (JP)

( * ) Notice: Subject to any disclaimer, the term of this patent is extended or adjusted under 35 U.S.C. 154(b) by 251 days.

(21) Appl. No.: 10/699,818

(22) Filed: Nov. 4, 2003

(65) Prior Publication Data

US 2004/0112800 A1    Jun. 17, 2004

(30) Foreign Application Priority Data

Dec. 17, 2002  (JP) ............................. 2002-365075

(51) Int. Cl.[7] .............................. B04B 5/06; B04B 9/12
(52) U.S. Cl. .............................. 494/22; 494/83; 494/84
(58) Field of Search .......................... 494/1, 7, 10, 22, 494/43, 46, 65, 83, 84, 380.1

(56) References Cited

U.S. PATENT DOCUMENTS

| | | | |
|---|---|---|---|
| 3,332,614 A | * | 7/1967 | Webster et al. ............... 494/22 |
| 3,674,196 A | * | 7/1972 | Gutter ........................ 494/60 |
| 3,902,658 A | * | 9/1975 | Madsen ....................... 494/14 |
| 4,786,480 A | * | 11/1988 | Martin ....................... 422/259 |
| 4,824,430 A | * | 4/1989 | Kashihara et al. ............ 494/22 |
| 4,857,040 A | * | 8/1989 | Kashihara et al. ............ 494/22 |
| 4,925,441 A | * | 5/1990 | Jubin ......................... 494/32 |
| 4,959,158 A | * | 9/1990 | Meikrantz ................... 210/787 |
| 5,024,647 A | * | 6/1991 | Jubin et al. .................. 494/37 |
| 5,254,075 A | * | 10/1993 | Nemoto et al. ............... 494/35 |
| 5,254,076 A | * | 10/1993 | Chow et al. .................. 494/37 |
| 5,267,936 A | * | 12/1993 | Miachon ....................... 494/22 |
| 5,571,070 A | * | 11/1996 | Meikrantz et al. ............ 494/22 |
| 5,591,340 A | * | 1/1997 | Meikrantz et al. ....... 210/512.3 |
| 5,762,800 A | * | 6/1998 | Meikrantz et al. ....... 210/512.3 |
| 6,203,483 B1 | * | 3/2001 | Birdwell et al. .............. 494/22 |

(Continued)

FOREIGN PATENT DOCUMENTS

GB          1832300      *    1/1975

(Continued)

*Primary Examiner*—Charles E. Cooley
(74) *Attorney, Agent, or Firm*—Wenderoth, Lind & Ponack, L.L.P.

(57) ABSTRACT

A centrifugal extractor of non-contact journaled construction is provided in which, even under the environments of corrosive gase and mist-like liquid such as nitric acid mist generated in the reprocessing of a spent nuclear fuel, no problem in corrosion or deterioration of parts occurs and high reliability is obtained, and operation is enabled for a long period of time free from maintenance. A rotor 12 housed in a rotor housing 10 is journaled by a main shaft 14 and rotated and driven by a motor 16. The main shaft is surrounded by a drive-portion housing 30, and has a thrust magnetic disk 36 on the upper end and radial magnetic disks 46, 48 and a motor-rotor portion 54 in the circumference thereof. Thrust bearing electromagnets 38a, 38b, radial bearing electromagnets 50, 52 and a motor stator portion 56 are incorporated into the drive-portion housing, and covered by non-magnetic anticorrosive protective plates 40, 42, and a protective pipe 64, the motor-rotor portion being also covered by a protective can 58. Slide bearings 66, 68 for touch down made of fluorocarbon resin are disposed on the upper end of the main shaft and on the inner wall of the drive-portion housing in the vicinity of the upper end of the rotor.

4 Claims, 1 Drawing Sheet

U.S. PATENT DOCUMENTS

| | | | |
|---|---|---|---|
| 6,238,329 B1 * | 5/2001 | Rogers ......................... | 494/22 |
| 6,280,375 B1 * | 8/2001 | Meisberger et al. .......... | 494/84 |
| 6,379,293 B1 * | 4/2002 | Kim et al. .................... | 494/56 |
| 6,440,054 B1 * | 8/2002 | Galik ........................... | 494/22 |
| 6,440,055 B1 * | 8/2002 | Meisberger .................. | 494/84 |
| 6,699,169 B2 | 3/2004 | Ogino et al. | |
| 2005/0003944 A1 * | 1/2005 | Rivalier et al. ............... | 494/22 |

FOREIGN PATENT DOCUMENTS

| | | | |
|---|---|---|---|
| GB | 1 383 124 | | 2/1975 |
| GB | 1392210 | * | 4/1975 |
| JP | 57-117357 | * | 7/1982 |
| JP | 57-180403 | * | 11/1982 |
| JP | 57-180404 | * | 11/1982 |
| JP | 10-319177 | | 12/1998 |

* cited by examiner

CENTRIFUGAL EXTRACTOR OF NON-CONTACT JOURNALED CONSTRUCTION

BACKGROUND OF THE INVENTION

The present invention relates to a centrifugal extractor of non-contact journaled construction using magnetic bearings, and in more detail, relates to a centrifugal extractor of non-contact journaled construction devised, in extracting and separating U (uranium) and Pu (plutonium) under the environment of corrosive gas and mist-like liquid in a reprocessing process of a spent nuclear fuel, so as to be able to plan the high reliance and long service life.

There is a Purex (Plutonium Reduction Oxidation) process which is one of reprocessing methods for a spent nuclear fuel produced from nuclear facilities. This process is, as is well-known, a process for dissolving a spent nuclear fuel into nitric acid, and separating and recovering U and Pu dissolved in the nitric acid aqueous solution by solvent extraction operation.

There are some kinds of apparatuses for carrying out the solvent extraction operation, one of which is a centrifugal extractor for carrying out separation of two liquid phases (an aqueous phase and an organic phase) by centrifugal force. This centrifugal extractor is designed so that a rotor is supported rotatably in a state of being suspended by a main shaft in a housing, an aqueous phase and an organic phase are supplied to the outer circumference of the rotor and mixed between the housing and the rotor, the mixed phase is sucked into the rotor and separated into two phases in a centrifugal force field internally of the rotor, and the separated phases are discharged to corresponding collectors.

Such a centrifugal extractor as described above has advantages that processing speed is high, that since the rising time of apparatus is quick, an operating rate is enhanced and equipment can be simplified, that apparatus can be designed to be a smaller type, that deterioration of radiation of a solvent can be reduced, and the like, as compared with other extractors (for example, such as a mixer-settler extraction apparatus, a pulse column extraction apparatus, etc.). Therefore, this centrifugal extractor is said to be advantageous for reprocessing a fast breeder fuel of high burnup and high Pu-enrichment, and study and development thereof have been progressed.

Incidentally, in the re-processing process for a spent nuclear fuel, since nuclear fuel materials being dissolved in nitric acid is solvent-extracted using TBP (tributyl phosphate) as an extracting solvent, nitric acid mists are generated. Accordingly, it is necessary for the centrifugal extractor to have materials and construction capable of resisting use under the environment of corrosive gas and mist-like liquid as described above.

The centrifugal extractor for the reprocessing for a spent nuclear fuel developed so far is of a spindle construction in which a rolling bearing is used to support the main shaft for suspending the rotor. From the result of the service life test, stainless steel (SUS 440C) is used as materials for inner ring and outer ring of the rolling bearing, a rolling body, a holding unit or the like.

However, the interior of the centrifugal extractor used in the reprocessing process for a spent nuclear fuel is exposed to the nitric acid mists generated on the process, as described above, and therefore, rust in the rolling bearing and deterioration of a lubricating agent (grease) occur, and operation for a long period of time cannot be carried out without maintenance unless the measures against the nitric acid mists such as air purge are taken. Further, even if ceramic materials are sued in place of the stainless steel (SUS 440C), the lubricating agent unavoidably deteriorates, making it difficult to operate continuously for a long period of time.

As is known, there is a magnetic bearing as one kind of a bearing used in rotating machines. This magnetic bearing is a bearing of construction in which the magnetic force is exerted to levitate a shaft whereby a rotating element is supported with respect to a fixed element in a non-contact manner, which magnetic bearing is applied to a rotating machine for which high speed rotation (for example, 10000 rpm or more) is exclusively required. In the case of the centrifugal extractor used in the reprocessing process for a spent nuclear fuel, the magnetic bearing is not used for the reasons such that the rotational speed is relatively low (for example, approximately 3000 to 4000 rpm), that since an electromagnet (coil) is required for generation of a magnetic field, there poses a problem in corrosion/deterioration caused by the nitric acid mists or the like, and therefore, the rolling bearing is used at present as mentioned previously.

SUMMARY OF THE INVENTION

It is an object of the present invention to provide a long service-life type centrifugal extractor in which even under the environment of corrosive gas or a mist-like liquid such as nitric acid mists generated in the reprocessing process for a spent nuclear fuel, no problem in corrosion or deterioration of parts to provide high reliability, and operation is enabled for a long period of time free from maintenance.

The present invention provides, in a centrifugal extractor of construction in which a rotor housed in a rotor housing is rotatably journaled in a state of being suspended by a main shaft extended upwardly, the main shaft is rotated and driven by a motor to thereby rotate the rotor, an aqueous phase and an organic phase supplied to the outer circumference of the rotor are mixed between the rotor housing and the rotor, a mixed phase is taken into the rotor and is separated into two phases in a centrifugal force field internally of the rotor, and the separated phases are discharged, a centrifugal extractor of non-contact journaled construction characterized in that the outside of the main shaft is surrounded air-tightly by a drive-portion housing coupled to said rotor housing, the main shaft has a thrust magnetic disk on the upper end thereof and has a radial magnetic cylinder and a motor-rotor portion in the circumference thereof, thrust bearing electromagnets are incorporated up and down so as to hold the thrust magnetic disk therebetween into the inner surface of the drive-portion housing and covered by non-magnetic anticorrosive protective plates and a radial bearing electromagnet and a motor-stator portion are incorporated therein opposite the radial magnetic cylinder and the motor-rotor portion and covered by non-magnetic anticorrosive protective pipes, the motor-rotor portion being also covered by a non-magnetic anticorrosive protective can, and touch-down bearings are disposed in the vicinity of the upper end and in the vicinity of the lower end, respectively, of the main shaft.

Here, the thrust magnetic disk and the thrust bearing electromagnets provided up and down so as to hold the former therebetween constitute a thrust magnetic bearing, and the radial magnetic cylinder and the radial bearing electromagnet opposite thereto constitute a radial magnetic bearing.

The touch-down bearing is not used in normal operation, and thus the slight lowering of performance can be allowed. Therefore, a rolling bearing may be used, but in case of the rolling bearing, a bearing using a ceramic ball or the like as a rolling body is preferred. More preferably, a slide bearing formed of fluorocarbon resin is used as the touch-down bearing. It is because of the fact that since the slide bearing requires no lubricating agent, no problem such as deterioration occurs. The touch-down bearings are preferably disposed on the inner walls of the drive-portion housing in the vicinity of the upper end of the main shaft and in the vicinity of the upper end of the rotor, respectively.

As described above, the present invention has a significant feature in that winding parts such as bearing electromagnets, motor stator portion and the like are covered by the protective plate and protective pipe to thereby realize operation of high stabilized reliability over a long period of time under the corrosive environments. Further, when the slide bearing formed of fluorocarbon resin is employed as the touch-down bearing, higher reliability and longer service life can be provided, which is a further feature of the invention.

The drive-portion housing comprises, for example, a combination of a cylindrical member having flanges on both upper and lower ends thereof and a disk-like member for blocking the upper end flange. The motor-rotor portion is positioned substantially in the central portion in the axial direction of the main shaft, on the upper and lower portions of which are disposed radial magnetic cylinders, which construction is preferable because the balance is improved. Furthermore, a construction is preferable in which magnetic detection type position sensors are incorporated into the inner wall of the drive-portion housing so as to oppose to both the radial magnetic cylinders.

PREFERRED EMBODIMENTS OF THE INVENTION

Figure 1:
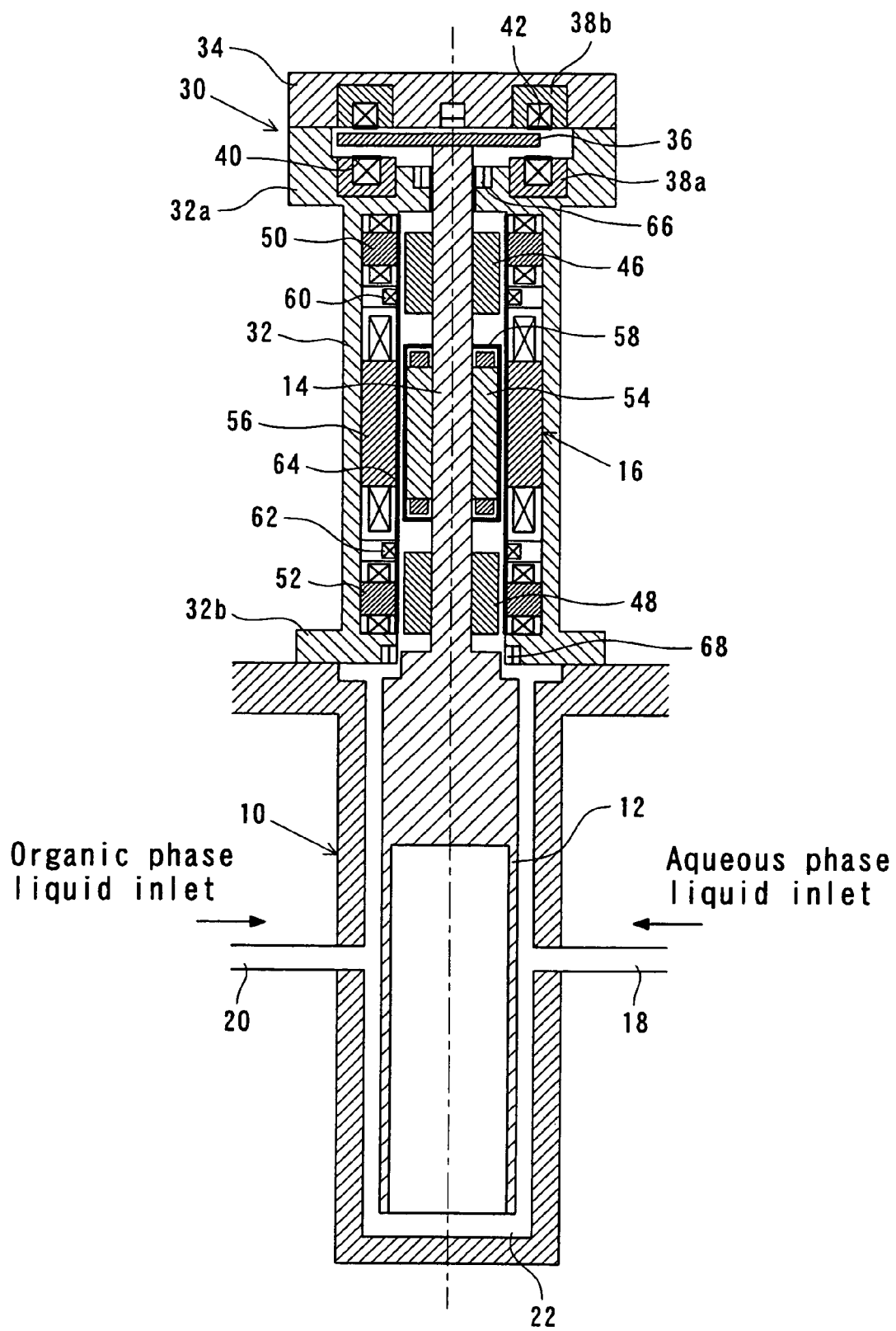
FIG. 1 is a longitudinal sectional view showing an embodiment of a centrifugal extractor of non-contact journaled construction according to the present invention.

FIG. 1 is a longitudinal sectional view showing an embodiment of a centrifugal extractor of non-contact journaled construction according to the present invention. In the centrifugal extractor, a rotor 12 is housed in a lower rotor housing 10 through a gap, and the rotor 12 is rotatably journaled in a state suspended by an upwardly extending main shaft 14. The main shaft 14 is rotated and driven by a motor 16 whereby the rotor 12 is rotated. Thereby, an aqueous phase and an organic phase are supplied from liquid inlets 18 and 20, respectively, provided on the side wall of the rotor housing 10, and are mixed by rotation of the rotor 12 in a gap (mixing portion 22) between the rotor housing 10 and the rotor 12, a mixed phase being sucked into the rotor 12 from a lower-end opening of the rotor 12. Then, it is separated into two phases in a centrifugal force field internally of the rotor 12, and the separated phases are respectively fed to the succeeding stage. These rotor housing 10, rotor 12 and main shaft 14 are formed of stainless steel (in this case, SUS 304) which is an anticorrosive constructional material. The rotor 12 and the main shaft 14 is preferably of an integral construction, but a separate coupled construction may be also employed.

The outside of the main shaft 14 is completely (air-tightly) surrounded by a drive-portion housing 30 coupled to the rotor housing 10. The drive-portion housing 30 comprises a combination of a cylindrical member 32 having flanges on both upper and lower ends thereof, and a disk-like member 34 for blocking an upper-end flange 32a. The cylindrical member 32 and the disk-like member 34 constituting the drive-portion housing 30 are likewise formed of stainless steel (in this case, SUS 304) which is an anticorrosive constructional material. The upper surface of the rotor housing 10 is coupled at a lower-end flange 32b of the cylindrical member 32.

The main shaft 14 has a thrust magnetic disk 36 on the upper end thereof. On the other hand, the upper-end flange 32a of the cylindrical member 32 is formed with a recess capable of easily housing the thrust magnetic disk 36, and thrust bearing electromagnets 38a and 38b are incorporated into the recess bottom of the upper-end flange 32a of the cylindrical member 32 and the lower surface of the disk-like member 34, respectively, so as to hold the thrust magnetic disk 36 therebetween. These thrust bearing electromagnets 38a and 38b are formed by winding a coil of an enamel wire about a magnetic core. Non-electrolytic nickel plating of a significantly anticorrosive type having a high phosphorus content is applied to the whole surface of the thrust magnetic disk 36 and the whole surface of the magnetic cores of the thrust bearing electromagnets 38a and 38b. Further, non-magnetic anticorrosive disk-like protective plates 40 and 42 are mounted by whole-circumferential welding so as to cover at least the coil portions of the thrust bearing electromagnets 38a and 38b. These protective plates 40 and 42 are formed of, for example, SUS 304 or SUS 316L and the plate thickness may be 0.3 mm or so. A thrust magnetic bearing is constituted by the thrust magnetic disk 36 and the thrust bearing electromagnets 38a and 38b arranged oppositely.

Radial magnetic cylinders 46 and 48 are mounted in the upper outer circumference and lower outer circumference, respectively, of the main shaft 14, whereas radial bearing electromagnets 50 and 52 are respectively incorporated internally of the cylindrical member 32 of the drive-portion housing 30 so as to surround the radial magnetic cylinders 46 and 48. The radial magnetic cylinders 46 and 48 are formed from, for example, a silicon steel plate. The non-electrolytic nickel plating of a significantly anticorrosive type may be applied as necessary. The radial bearing electromagnets 50 and 52 are constituted by winding a coil of an enamel wire about a core formed from a silicon steel plate. Radial magnetic bearings are constituted by the radial magnetic cylinders 46 and 48 and the radial bearing electromagnets 50 and 52 arranged coaxially.

A motor-rotor portion 54 is provided on the outer circumference in the central portion of the main shaft 14, whereas a motor stator portion 56 is incorporated internally of the cylindrical member 32 of the drive-portion housing 30 so as to surround the motor-rotor portion 54. Since the motor-rotor portion 54 is formed of silicon steel plate or aluminum, it is covered by a non-magnetic anticorrosive protective can (for example, SUS 304 or SUS 316L) 58 and closed up by the whole circumferential welding. The motor stator portion 56 is constituted by winding a coil of an enamel wire about a core formed from a silicon steel plate. The motor 16 is constituted by the motor-rotor portion 54 and the motor stator portion 56 arranged coaxially.

Magnetic detection type position sensors 60 and 62 are incorporated, so as to opposite to the radial magnetic cylinders 46 and 48, respectively, into the lower portion of the upper radial bearing electromagnet 50 and the upper portion of the lower radial bearing electromagnet 52, respectively, internally of the cylindrical member 32 of the drive-portion housing 30. These position sensors 60 and 62 are formed by applying a winding of an enamel wire about a ferrite core to perform the function of detecting a position of the radial magnetic cylinders 46 and 48, or a position of the main shaft 14. The position sensors 60 and 62 are used such that by monitoring signals of the position sensors 60 and 62, even if the rotor as a rotating body in the center should be inclined under the influence of disturbance of a supplied liquid or the like, the magnetic bearing is controlled so that the rotor can be returned to the center position.

In order to protect various winding parts as described above to be incorporated internally of the cylindrical member 32 of the drive-portion housing 30, the inner surface of the cylindrical member 32 is covered by a non-magnetic anticorrosive protective pipe 64 from the upper end of the upper radial bearing electromagnet 50 to the lower end of the lower radial bearing electromagnet 52 to provide a sealed construction by the whole circumferential welding. This protective pipe 64 is formed of, for example, SUS 304 or SUS 316L, and the plate thickness thereof may be about 0.3 mm.

As described above, the centrifugal extractor according to the present invention is of the integral construction in which it has a positional relation that the motor 16 is positioned substantially in the central in the axial direction of the main shaft 14, on upper and lower portions of which the radial magnetic bearings are disposed with spacing, and the motor 16 is housed into a slim form, which is supported by the upper and lower radial magnetic bearings in a well balanced manner.

Further, in the vicinity of the upper end of the main shaft 14 and in the vicinity of the upper end of the rotor 12, slide bearings 66 and 68 for touch down formed of fluorine resin are disposed on the inner wall of the cylindrical member 32 of the drive-portion housing 30. The upper slide bearing 66 for touch down is mounted on a notch which is provided at the corner of the upper end of the internally extended inner wall of the upper end of the cylindrical member 32, opposing to the outer circumferential surface of the main shaft 14 with a slight spacing. The lower slide bearing 68 for touch down is mounted on a notch which is provided at the inner corner of the lower end of the cylindrical member 32, opposing to the outer circumferential surface of a small diameter portion of the upper end of the rotor with a slight spacing. For these slide bearings 66 and 68 for touch down, fluorocarbon resin, for example, polytetrafluoroethylene (PTFE) resin is optimum as described above.

As described above, the main shaft 14 and the rotor 12 thereunder are rotatably journaled in a non-contact state by the thrust magnetic bearing and the radial magnetic bearing. The thrust bearing electromagnets 38a and 38b load a thrust load on the drive-portion housing side, and the radial bearing electromagnets 50 and 52 load a radial load on the drive-portion housing side. And, the main shaft 14 is rotated and driven by the motor 16 comprising the motor-rotor portion 54 and the motor stator portion 56 to rotate the motor 12. The slide bearings 66 and 68 for touch down prevent contact between the rotating bodies (main shaft 14 and rotor 12) and the housings 10 and 30 in case of emergency. The centrifugal extractor used in the reprocessing process for a spent nuclear fuel has a rotational frequency of about 3000 to 4000 rpm, which is relatively low speed as compared with the rotating machines usually employing a magnetic bearing for high speed rotation (10000 rpm or more), and therefore, the slide bearing can be employed as the touch down bearing.

In the reprocessing process for a spent nuclear fuel, the corrosive gas and mist-like liquid such as nitric acid mists are generated from the liquid processed by the centrifugal extractor, and the housing is internally exposed to the corrosive environment for a long period of time. However, all the winding parts easily corroded are covered by anti-corrosive materials (protective plates 40, 42, protective pipe 64 and protective can 58), thus completely eliminating possible corrosion. Further, for the touch down bearing unavoidably exposed to the corrosive environment, a slide bearing requiring no lubricating agent such as grease is employed and fluorocarbon resin excellent in corrosiveness is used to enable solving all the problems of corrosion and deterioration. In this manner, it is possible to obtain a centrifugal extractor of high reliability which is operated positively free from maintenance over a long period of time.

Furthermore, the centrifugal extractor according to the present embodiment is devised to have the construction in which disassembling and assembling are carried out easily. In FIG. 1, when the disk-like member 34 of the drive-portion housing 30 is removed from the cylindrical member 32, and the thrust magnetic disk 36 is removed from the main shaft 14, the cylindrical member 32 of the drive-portion housing 30 having various kinds of winding parts and the slide bearings 66 and 68 for touch down mounted thereon can be all pulled up merely by separating a coupling between the drive-portion housing 30 and the rotor housing 10. Thereafter, the main shaft 14 having the radial magnetic cylinders 46 and 48 and the motor-rotor portion 54 mounted thereon and the rotor 12 can be pulled out. Because of this, even in case of requiring maintenance such as replacement of parts, such a work can be done easily and quickly.

The present invention provides the centrifugal extractor in which the easily corrosive winding parts necessary for the magnetic bearings and parts related to the motor are all covered and protected by the anticorrosive materials. Thus, the bearing lubricating agent (such as grease) is not necessary, and there occurs no problem in deterioration of grease caused by corrosive liquids and radiant rays. Further, since it can be rotated and driven in a non-contact manner, the reliability is enhanced, and the operation free from maintenance for a long period of time becomes possible.

Further, when a slide bearing formed of fluorocarbon resin excellent in anti-corrosiveness is employed for the touch down bearing unavoidably exposed to the corrosive environment, the reliability is further enhanced, and the longer service life can be expected.

When the drive-portion housing is made to comprise a combination of the cylindrical member having flanges on both upper and lower ends and the disk-like member for blocking the upper-end flange, it can be disassembled into a few blocks easily and quickly, and even in case of requiring maintenance, such a work is done easily. Further, when an employment is made of the construction in which the motor-rotor portion is positioned substantially in the central portion in the axial direction of the main shaft, and the radial magnetic cylinders are disposed at upper and lower portions thereof, the balance of the rotor rotation is improved.

What is claimed is:

1. In a centrifugal extractor of construction in which a rotor housed in a rotor housing is rotatably journaled in a state of being suspended by a main shaft extended upwardly, said main shaft is rotated and driven by a motor to thereby rotate the rotor, an aqueous phase and an organic phase supplied to the outer circumference of the rotor are mixed between the rotor housing and the rotor, a mixed phase is sucked into the rotor and is separated into two phases in a centrifugal force field internally of the rotor, and the separated phases are discharged, a centrifugal extractor of non-contact journaled construction characterized in that the outside of said main shaft is surrounded air-tightly by a drive-portion housing coupled to said rotor housing, the main shaft has a thrust magnetic disk on the upper end thereof and has at least one radial magnetic cylinder and a motor-rotor portion in the circumference thereof, thrust bearing electromagnets are incorporated up and down so as to hold the thrust magnetic disk therebetween into the inner surface of the drive-portion housing and covered by non-magnetic anticorrosive protective plates, at least one radial bearing electromagnet and a motor-stator portion are incorporated into the inner surface of the drive-portion housing opposite the at least one radial magnetic cylinder and the motor-rotor portion, respectively, and covered by a non-magnetic anticorrosive protective pipe, the motor-rotor portion is also covered by a non-magnetic anticorrosive protective can, and touch-down bearings are disposed in the vicinity of the upper end and in the vicinity of the lower end, respectively, of the main shaft.

2. The centrifugal extractor of non-contact journaled construction according to claim 1, wherein the touch-down bearings are slide bearings formed of fluorocarbon resin, which are disposed on the inner walls of the drive-portion housing in the vicinity of the upper end of the main shaft and in the vicinity of the upper end of the rotor, respectively.

3. The centrifugal extractor of non-contact journaled construction according to claim 2, wherein the drive-portion housing comprises a combination of a cylindrical member having flanges on both upper and lower ends thereof and a disk-like member for blocking the upper end flange, the motor-rotor portion is positioned substantially in the central portion in the axial direction of the main shaft, on the upper and lower portions of which are disposed radial magnetic cylinders, and magnetic detection type position sensors are incorporated into the inner wall of the drive-portion housing so as to oppose to both the radial magnetic cylinders.

4. The centrifugal extractor of non-contact journaled construction according to claim 1, wherein the drive-portion housing comprises a combination of a cylindrical member having flanges on both upper and lower ends thereof and a disk-like member for blocking the upper end flange, the motor-rotor portion is positioned substantially in the central portion in the axial direction of the main shaft, on the upper and lower portions of which are disposed radial magnetic cylinders, and magnetic detection type position sensors are incorporated into the inner wall of the drive-portion housing so as to oppose to both the radial magnetic cylinders.

* * * * *